(12) United States Patent
Yamaoka

(10) Patent No.: US 10,894,446 B2
(45) Date of Patent: Jan. 19, 2021

(54) TIRE

(71) Applicant: SUMITOMO RUBBER INDUSTRIES, LTD., Kobe (JP)

(72) Inventor: Hiroshi Yamaoka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 309 days.

(21) Appl. No.: 15/821,954

(22) Filed: Nov. 24, 2017

(65) Prior Publication Data
US 2018/0141389 A1 May 24, 2018

(30) Foreign Application Priority Data
Nov. 24, 2016 (JP) .................................. 2016-228089

(51) Int. Cl.
*B60C 11/12* (2006.01)
*B60C 11/03* (2006.01)

(52) U.S. Cl.
CPC ...... *B60C 11/1236* (2013.01); *B60C 11/0304* (2013.01); *B60C 11/0306* (2013.01); *B60C 11/1263* (2013.01); *B60C 11/1272* (2013.01); *B60C 2011/0365* (2013.01); *B60C 2011/0369* (2013.01); *B60C 2011/0381* (2013.01);
(Continued)

(58) Field of Classification Search
CPC ............ B60C 11/1236; B60C 11/1263; B60C 2011/1209; B60C 2011/0381; B60C 2011/1213; B60C 2011/0383
See application file for complete search history.

(56) References Cited

U.S. PATENT DOCUMENTS

| 4,705,088 | A | * | 11/1987 | Ghilardi | .............. B60C 11/0306 |
| | | | | | 152/209.18 |
| D345,535 | S | * | 3/1994 | Shinohara | ..................... D12/603 |

(Continued)

FOREIGN PATENT DOCUMENTS

| EP | 1 707 405 A1 | 10/2006 |
| EP | 1 920 951 A1 | 5/2008 |

(Continued)

OTHER PUBLICATIONS

Machine translation for Japan 2002-046426 (Year: 2019).*
(Continued)

*Primary Examiner* — Steven D Maki
(74) *Attorney, Agent, or Firm* — Birch, Stewart, Kolasch & Birch, LLP

(57) ABSTRACT

A tire comprises a tread portion 2. The tread portion 2 comprises a first main groove 11 and a second main groove 12 extending continuously in a tire circumferential direction, and a land region 21 defined between the first main groove 11 and the second main groove 12. The land region 21 is provided with a plurality of lateral grooves 15. Each of the lateral grooves 15 comprises a first lug groove portion 16 extending obliquely with respect to a tire axial direction from the first main groove 11, a second lug groove portion 17 extending obliquely in a same direction as the first lug groove portion 16 from the second main groove 12, and a sipe portion 18 extending obliquely in an opposite direction to the first lug groove portion 16 so as to connect between the first lug groove portion 16 and the second lug groove portion 17.

14 Claims, 12 Drawing Sheets

(52) U.S. Cl.
CPC ............... *B60C 2011/1209* (2013.01); *B60C 2011/1213* (2013.01)

(56) References Cited

U.S. PATENT DOCUMENTS

| | | | |
|---|---|---|---|
| 2012/0298269 A1* | 11/2012 | Mathonet | B60C 11/0306 152/209.16 |
| 2013/0098519 A1* | 4/2013 | Maehara | B60C 11/0306 152/209.22 |
| 2013/0167995 A1* | 7/2013 | Hada | B60C 11/0306 152/209.9 |
| 2017/0036488 A1* | 2/2017 | Takahashi | B60C 11/0302 |
| 2018/0178589 A1* | 6/2018 | Horiguchi | B60C 11/0306 |
| 2018/0264892 A1* | 9/2018 | Wakizono | B60C 11/1236 |

FOREIGN PATENT DOCUMENTS

| | | | |
|---|---|---|---|
| JP | 63-137003 A | * | 6/1988 |
| JP | 03-014704 A | * | 1/1991 |
| JP | 7-186626 A | | 7/1995 |
| JP | 08-048114 A | * | 2/1996 |
| JP | 2002-046426 A | * | 2/2002 |
| JP | 2007-320326 A | | 12/2007 |
| JP | 2012-179965 A | | 9/2012 |

OTHER PUBLICATIONS

Machine translation for Japan 63-137003 (Year: 2019).*
Machine translation for Japan 08-048114 (Year: 2020).*
Translation for Japan 03-014704 (Year: 2020).*
Extended European Search Report dated Apr. 3, 2018, in European Patent Application No. 17200737.9.

* cited by examiner

TIRE

TECHNICAL FIELD

The present invention relates to a tire having both steering stability on a dry road surface and on-ice/on-snow performance.

BACKGROUND ART

There have been proposed various tires having a tread portion provided with land regions divided by a plurality of main grooves extending continuously in a tire circumferential direction and lateral grooves extending so as to cross the entire land regions such as a tire disclosed in Japanese Unexamined Patent Application Publication No. 2012-179965, for example. The lateral grooves are helpful for improving wet performance and the on-ice/on-snow performance. On the other hand, the lateral grooves tend to decrease rigidity of the land regions, therefore, the steering stability on a dry road surface tends to deteriorate. Therefore, as to the above-described tires, there was room for further improvement on both of the steering stability on a dry road surface and the on-ice/on-snow performance.

SUMMARY OF THE INVENTION

The present invention was made in view of the above, and a primary object thereof is to provide a tire having the steering stability on a dry road surface and the on-ice/on-snow performance.

In one aspect of the present invention, a tire comprises a first main groove and a second main groove extending continuously in a tire circumferential direction, and a land region defined between the first main groove and the second main groove, the land region being provided with a plurality of lateral grooves, wherein each of the lateral grooves comprises a first lug groove portion extending obliquely with respect to a tire axial direction from the first main groove, a second lug groove portion extending obliquely in a same direction as the first lug groove portion from the second main groove, and a sipe portion extending obliquely in an opposite direction to the first lug groove portion so as to connect between the first lug groove portion and the second lug groove portion.

In another aspect of the invention, it is preferred that the sipe portion has a width not greater than 1.5 mm, and the first lug groove portion and the second lug groove portion have widths greater than 1.5 mm.

In another aspect of the invention, it is preferred that the sipe portion has a length in the tire axial direction smaller than those of the first lug groove portion and the second lug groove portion.

In another aspect of the invention, it is preferred that the land region includes a plurality of blocks divided by the lateral grooves, the blocks include at least one block provided with a crossing sipe, the crossing sipe comprises a first outer portion extending obliquely in the same direction as the first lug groove portion from the first main groove, a second outer portion extending obliquely in the same direction as the first lug groove portion from the second main groove, and a center portion extending obliquely in the opposite direction to the first lug groove portion so as to connect between the first outer portion and the second outer portion.

In another aspect of the invention, it is preferred that the center portion has a depth smaller than those of the first outer portion and the second outer portion.

In another aspect of the invention, it is preferred that the center portion is inclined with respect to the tire axial direction at a larger angle than that of the sipe portion.

In another aspect of the invention, it is preferred that the center portion overlaps the sipe portion in the tire axial direction.

In another aspect of the invention, it is preferred that the at least one block is provided with a first lug sipe extending obliquely in a same direction as the first outer portion from the first main groove and terminating within the block, and a second lug sipe extending obliquely in a same direction as the second outer portion from the second main groove and terminating within the block.

In another aspect of the invention, it is preferred that the at least one block is divided by the crossing sipe into a first block piece and a second block piece, the first lug sipe is arranged in the first block piece, and the second lug sipe is arranged in the second block piece.

In another aspect of the invention, it is preferred that the first lug sipe intersects with an extended area obtained by extending the second lug groove portion along a longitudinal direction thereof of one of the lateral grooves adjacent to the first block piece, and the second lug sipe intersects with an extended area obtained by extending the first lug groove portion along a longitudinal direction thereof of one of the lateral grooves adjacent to the second block piece.

DESCRIPTION OF THE PREFERRED EMBODIMENT

An embodiment of the present invention will now be described in detail in conjunction with accompanying drawings.

Figure 1:
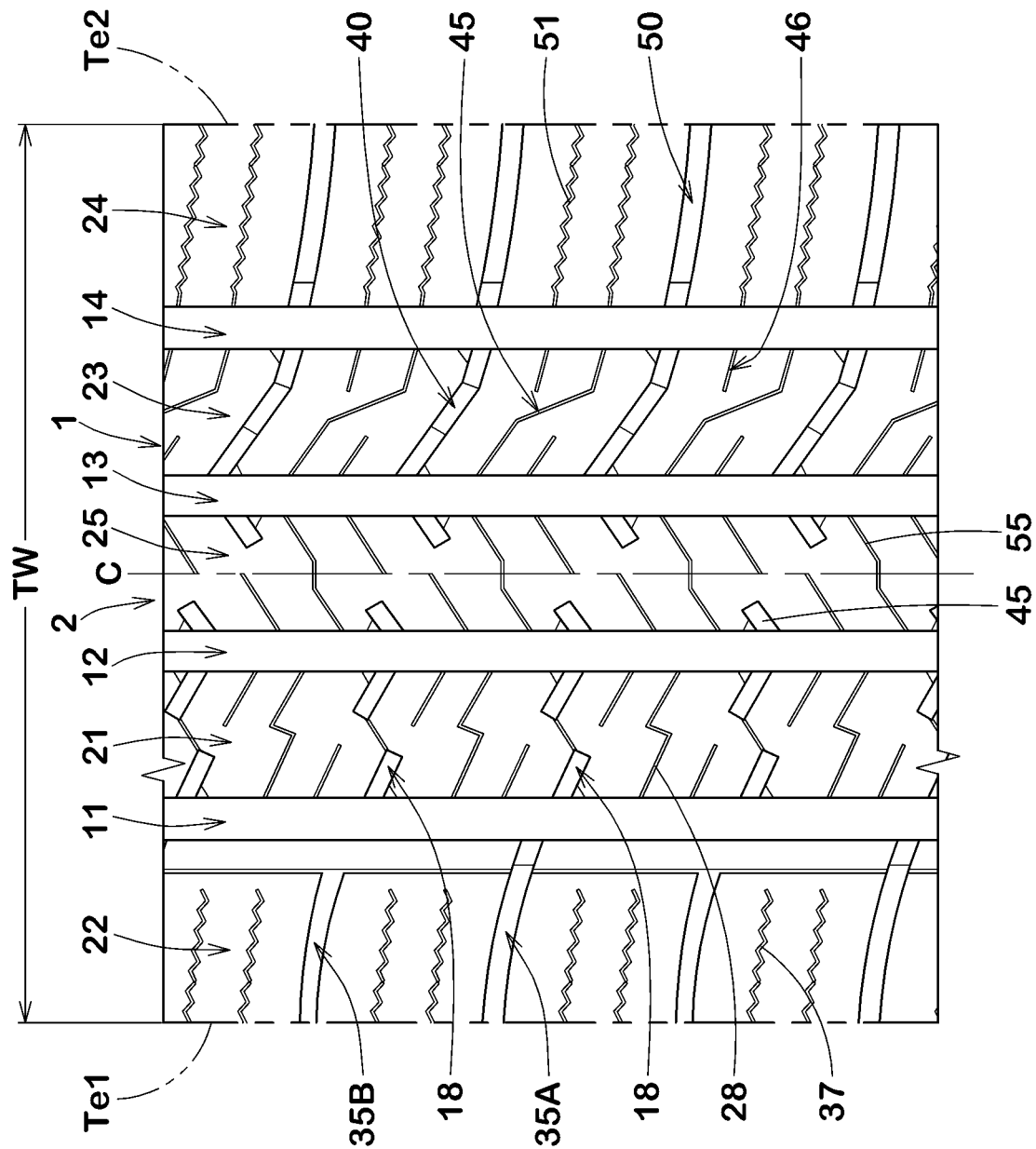
FIG. 1 is a development view of a tread portion of a tire according to an embodiment of the present invention.

FIG. 1 is a development view of a tread portion 2 of a tire 1 according to an embodiment of the present invention. The tire 1 of the present embodiment can be used for various tires such as a pneumatic tire for a passenger car and for heavy duty, and a non-pneumatic tire not filled with pressurized air, for example. The tire 1 of the present invention is suitably used for a winter tire for a passenger car, for example.

As shown in FIG. 1, the tread portion 2 in this embodiment has, for example, an asymmetric tread pattern whose position when mounted on a vehicle is specified. In this embodiment, a first tread edge Te1 disposed on the left side in FIG. 1 is positioned on an outer side of the vehicle when mounted, and a second tread edge Te2 disposed on the right side in FIG. 1 is positioned on an inner side of the vehicle when mounted. However, the present invention is not limited to such an embodiment, but can be applied to, for example, a tire whose position when mounted on a vehicle is not specified.

The first tread edge Te1 and the second tread edge Te2 are outermost ground contacting positions in a tire axial direction when the tire 1, in a case of a pneumatic tire, in a standard state is in contact with a flat surface with zero camber angle by being loaded with a standard tire load. The standard state is a state in which a tire is mounted on a standard rim, inflated to a standard pressure, and loaded with no tire load. In this specification, dimensions and the like of various parts of the tire are values measured in the standard state, unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 is provided with a plurality of main grooves continuously extending in the tire circumferential direction.
The plurality of the main grooves include a first main groove 11 and a second main groove 12 provided between a tire equator (C) and the first tread edge Te1 and a third main groove 13 and a fourth main groove 14 provided between the tire equator (C) and the second tread edge Te2.

The first main groove 11 is provided closest to the first tread edge Te1 among the main grooves 11, 12, 13, and 14, for example. The second main groove 12 is provided between the first main groove 11 and the tie equator (C), for example. The third main groove 13 is adjacent to the second main groove 12 on a side of the second tread edge Te2, for example. The second main groove 12 and the third main groove 13 are provided on each side of the tire equator (C), respectively. The fourth main groove is provided closest to the second tread edge Te2 among the main grooves 11, 12, 13, and 14.

It is preferred that the first main groove 11 and the fourth main groove 14 are provided so that groove center lines thereof are each arranged at a distance in a range of from 0.20 to 0.35 times a tread width TW from the tire equator (C), for example. It is preferred that the second main groove 12 and the third main groove 13 are provided so that groove center lines thereof are each arranged at a distance in a range of from 0.05 to 0.15 times the tread width TW from the tire equator (C), for example. The tread width TW is a distance in the tire axial direction between the first tread edge Te1 and the second tread edge Te2 of the tire 1 in the standard state.

It is preferred that a groove width of each of the main grooves 11, 12, 13, and 14 is in a range of from 3% to 7% of the tread width TW, for example. It is preferred that a groove depth of each of the main grooves 11, 12, 13, and 14, in a case of a tire for a passenger car, is in about a range of from 5 to 10 mm. However, the dimensions of the main grooves 11, 12, 13, and 14 are not limited to such ranges.

The tread portion 2 is provided with a plurality of land regions divided by the main grooves 11, 12, 13, and 14. The land regions include a first land region 21 defined between the first main groove 11 and the second main groove 12.

Figure 2:
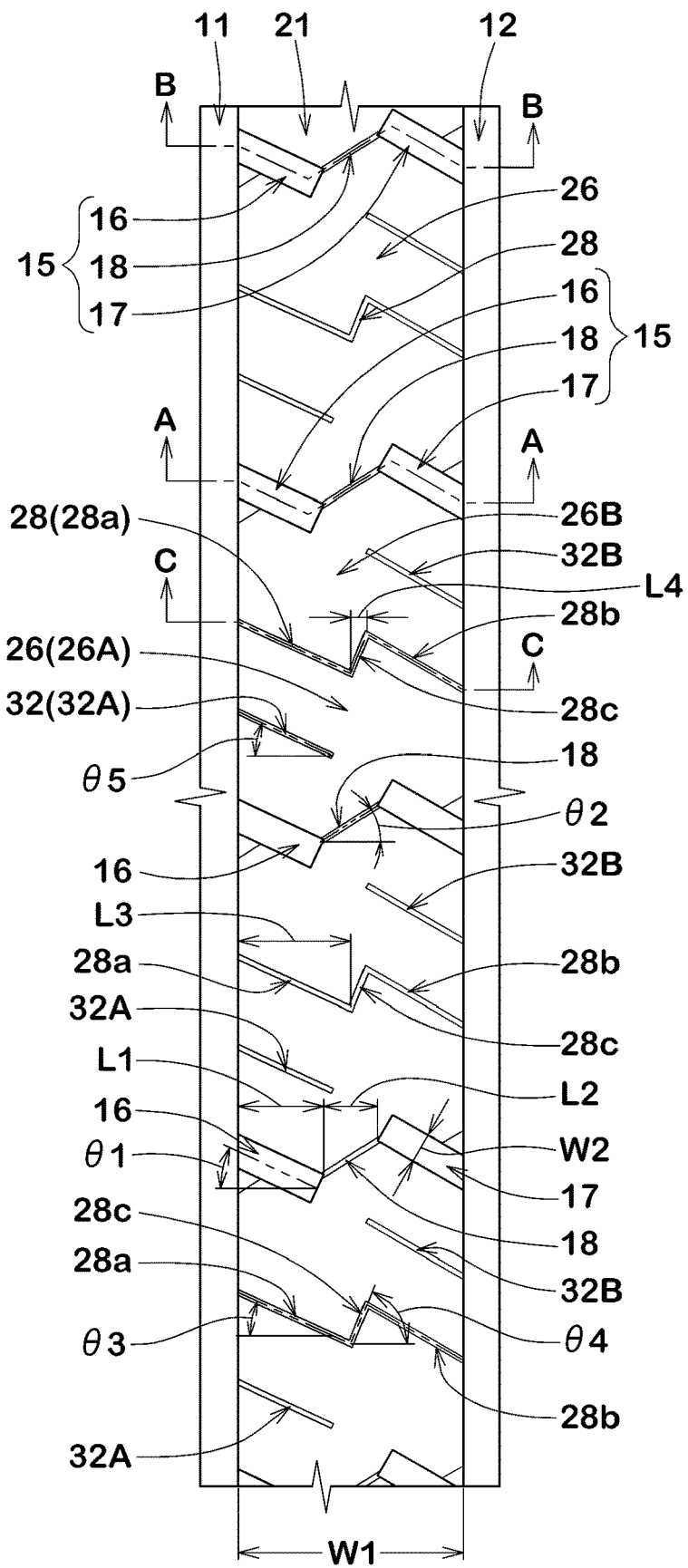
FIG. 2 is an enlarged view of a first land region of a tread portion.

FIG. 2 is an enlarged view of the first land region 21. As shown in FIG. 2, it is preferred that a width W1 in the tire axial direction of the first land region 21 is in a range of from 0.15 to 0.25 times the tread width TW (shown in FIG. 1 and the same applies hereinafter), for example.
However, the present invention is not limited to such an embodiment. Further, the first land region 21 is provided with a plurality of lateral grooves 15.

Each of the lateral grooves 15 includes a first lug groove portion 16, a second lug groove portion 17, and a sipe portion 18. The first lug groove portion 16 extends from the first main groove 11 and obliquely with respect to the tire axial direction. The second lug groove portion 17 extends from the second main groove 12 and obliquely in the same direction as the first lug groove portion 16. The sipe portion 18 extends obliquely in the opposite direction to the first lug groove portion 16 so as to connect between the first lug groove portion 16 and the second lug groove portion 17. Note that, in this specification, "sipe portion" and "sipe" mean a groove having a width not greater than 1.5 mm.

The lateral grooves 15 include the sipe portions 18, therefore, it is possible decrease of rigidity in the tire circumferential direction of the first land region 21 is prevented, and thereby, it is possible that high traction and braking force on a dry road surface and excellent steering stability are exerted. Further, during running on a snowy road, the first lug groove portions 16 and the second lug groove portions 17 of the lateral grooves 15 exert snow shearing force, therefore, it is possible that the on-snow traction is increased. Furthermore, the lateral grooves 15 have the first lug groove portions 16 and the second lug groove portions 17 inclined in the same directions, and the sipe portions 18 inclined in the opposite directions each disposed between a pair of the first lug groove portion 16 and the second lug groove portion 17, therefore, by edges thereof, large frictional force is exerted in the tire axial direction when running on ice, thereby, it is possible that the traction and the braking force on ice are increased.

It is preferred that the first lug groove portions 16 and the second lug groove portions 17 extend straight, for example. However, the first lug groove portions 16 and the second lug groove portions 17 may be curved or bent, for example. In this case, it is preferred that the first lug groove portions 16 and the second lug groove portions 17 are curved or bent within a range in which the directions of the inclination do not change. Further, the first lug groove portions 16 and the second lug groove portions 17 may be, for example, those having a wavy shape. In this case, it is preferred that center lines of amplitudes of the wavy shapes of the first lug groove portions 16 and the second lug groove portions 17 are inclined in one direction.

It is preferred that angles θ1 of the first lug groove portions 16 and the second lug groove portions 17 with respect to the tire axial direction are, for example, in a range of from 20 to 30 degrees in order to exert frictional force in a good balance in the tire axial direction and the tire circumferential direction.

The first lug groove portions 16 and the second lug groove portions 17 have, for example, widths W2 greater than 1.5 mm. It is preferred that the widths W2 of the first lug groove portions 16 and the second lug groove portions 17 are, for example, in a range of from 0.08 to 0.15 times the width W1 of the land region 21.

It is preferred that the first lug groove portions 16 and the second lug groove portions 17 terminate without reaching a center position in the tire axial direction of the first land region 21, for example. For example, it is preferred that lengths L1 in the tire axial direction of the first lug groove portions 16 and the second lug groove portions 17 are in a range of from 0.30 to 0.40 times the width W1 of the first land region 21 in order to increase the steering stability and the on-ice/on-snow performance in a good balance.

It is preferred that the sipe portions 18 extend straight, for example. In the sipe portions 18, when ground contacting pressure is applied to the tread portion 2, opposed sipe walls thereof engage with each other, therefore, it is possible that apparent rigidity in the tire circumferential direction of the land region 21 is further increased. The sipe portions 18 may have a wavy shape, for example. In this case, it is preferred that center lines of amplitudes of the wavy shapes of the sipe portions 18 are inclined in one direction.

It is preferred that angles θ2 of the sipe portions 18 with respect to the tire axial direction are in a range of from 25 to 40 degrees, for example. It is preferred that lengths L2 in the tire axial direction of the sipe portions 18 are smaller than the lengths L1 of the first lug groove portions 16 and the second lug groove portions 17, and it is preferred that the lengths L2 are in a range of from 0.65 to 0.75 times the lengths L1, for example.

Figure 3A:
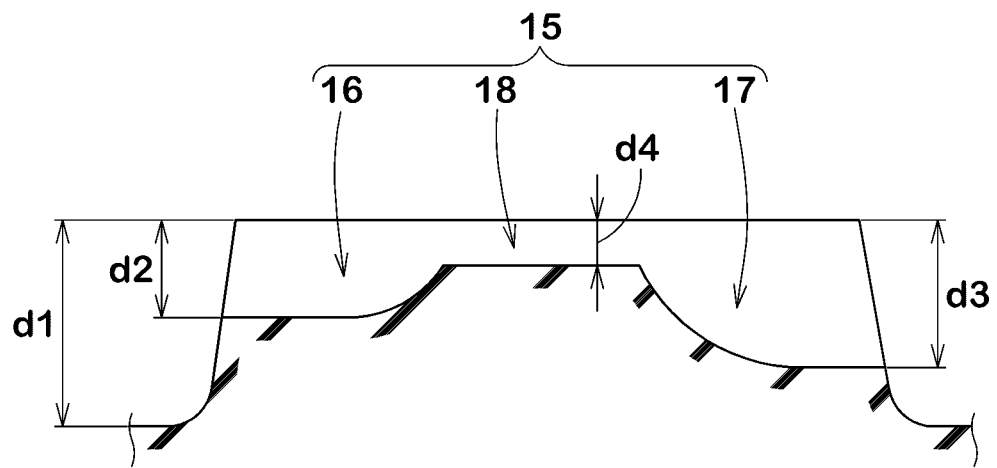
FIG. 3A is a cross-sectional view taken along A-A line of FIG. 2.
Figure 3B:
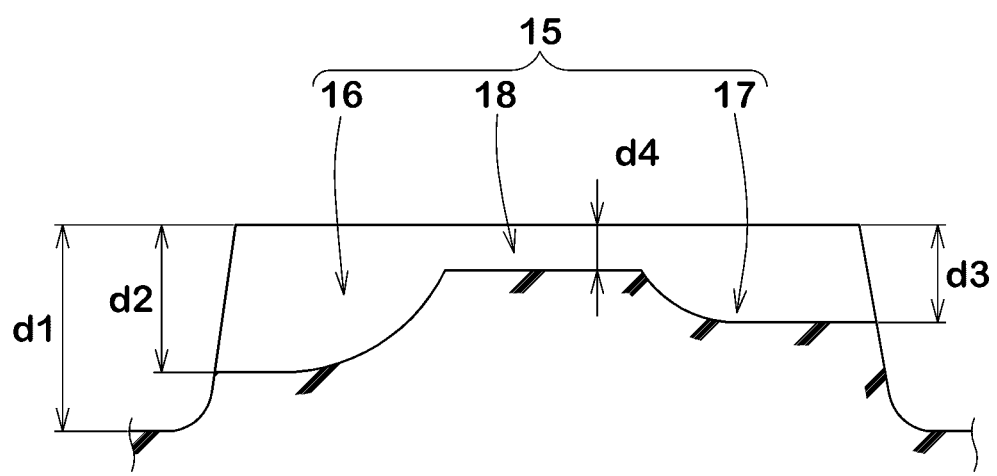
FIG. 3B is a cross-sectional view taken along B-B line of FIG. 2.

FIG. 3A is a cross sectional view of the lateral groove 15 taken along A-A line in FIG. 2. FIG. 3B is a cross sectional view taken along B-B line in FIG. 2 of the lateral groove 15 adjacent to the lateral groove 15 shown in FIG. 3A. As shown in FIGS. 3A and 3B, it is preferred that the first lug groove portion 16 has a different depth than the second lug groove portion 17, for example.

In this embodiment, the lateral grooves 15 (shown in FIG. 3A) in which the first lug groove portions 16 have smaller depths than the second lug groove portions 17 and the lateral grooves 15 (shown in FIG. 3B) in which the second lug groove portions 17 have smaller depths than the first lug groove portions 16 are formed. As a more preferred embodiment, in this embodiment, these lateral grooves 15 are arranged alternately in the tire circumferential direction. In such an embodiment, it is possible that the first land region 21 is uniformly worn. Further, due to such arrangement of the lug grooves, the land region 21 is likely to deform irregularly, therefore, it is useful for discharging snow in the lug grooves.

It is preferred that depths (d2) of the first lug groove portions 16 and depth (d3) of the second lug groove portions 17 are in a range of from 0.45 to 0.75 times a depth (d1) of the first main groove 11, for example. It is preferred that a ratio d2/d3 of the depth (d2) and the depth (d3) is in a range of from 0.6 to 1.8, for example.

The sipe portions 18 have, for example, constant depths (d4) in the tire axial direction. It is preferred that the depths (d4) of the sipe portions 18 are in a range of from 0.15 to 0.25 times the depth (d1) of the first main groove 11 at intersections thereof with the first lug groove portions, for example.

As shown in FIG. 2, the land region 21 includes a plurality of blocks 26 divided by the plurality of the lateral grooves 15. It is preferred that at least one of the plurality of the blocks 26 is provided with a crossing sipe 28 extending so as to completely cross the land region 21.

The crossing sipe 28 includes a first outer portion (28a), a second outer portion (28b), and a center portion (28c).

The first outer portion (28a) extends from the first main groove 11 and is inclined in the same direction as the first lug groove portions 16. The second outer portion (28b) extends from the second main groove 12 and is inclined in the same direction as the second lug groove portions 17. The center portion (28c) connects between the first outer portion (28a) and the second outer portion (28b) and is inclined in the opposite direction to the first outer portion (28a).

When drive power, braking force, or lateral force is applied to the tread portion 2, opposed sipe walls of the crossing sipe 28 engage with each other, therefore, it is possible that rigidity of the land region 21 is increased. Further, it is possible that the on-ice/on-snow performance is further improved by edges of the crossing sipe 28. Thereby, the steering stability and the on-ice/on-snow performance on a dry road surface are improved in a good balance by the crossing sipe 28.

It is preferred that the first outer portion (28a) and the second outer portion (28b) extend straight, for example. However, the first outer portion (28a) and the second outer portion (28b) may be curved or bent, for example. In this case, it is preferred that the first outer portion (28a) and the second outer portion (28b) are curved or bent within a range in which the directions of the inclination do not change. Further, the first outer portion (28a) and the second outer portion (28b) may have a wavy shape, for example. In this case, it is preferred that center lines of amplitudes of the waves of the first outer portion (28a) and the second outer portion (28b) are inclined in one direction.

It is preferred that an angle θ3 of the first outer portion (28a) and the second outer portion (28b) with respect to the tire axial direction is in a range of from 20 to 30 degrees, for example. It is preferred that lengths L3 in the tire axial direction of the first outer portion (28a) and the second outer portion (28b) are larger than the lengths L1 of the first lug groove portion 16 and the second lug groove portion 17, for example. Specifically, it is preferred that the lengths L3 are in a range of from 0.45 to 0.55 times the width W1 of the first land region 21, for example.

It is preferred that the center portion (28c) extends straight, for example. The center portion (28c) configured as such is helpful for suppressing uneven wear of the land region. However, the center portion (28c) may be curved or bent, or may have a wavy shape, for example.

It is preferred that the center portion (28c) overlaps with the sipe portion 18 in the tire axial direction when viewed in the tire circumferential direction. Thereby, the uneven wear of the first land region 21 is suppressed.

It is preferred that the center portion (28c) is inclined at an angle θ4 larger than the sipe portions 18 with respect to the tire axial direction, for example. Specifically, it is preferred that the angle θ4 of the center portion (28c) with respect to the tire axial direction is in a range of from 65 to 75 degrees, for example.

It is preferred that the center portion (28c) has a length L4 in the tire axial direction smaller than those of the sipe portions 18. It is preferred that the length L4 of the center portion (28c) is in a range of from 0.05 to 0.15 times the width W1 of the first land region 21, for example.

Figure 4:
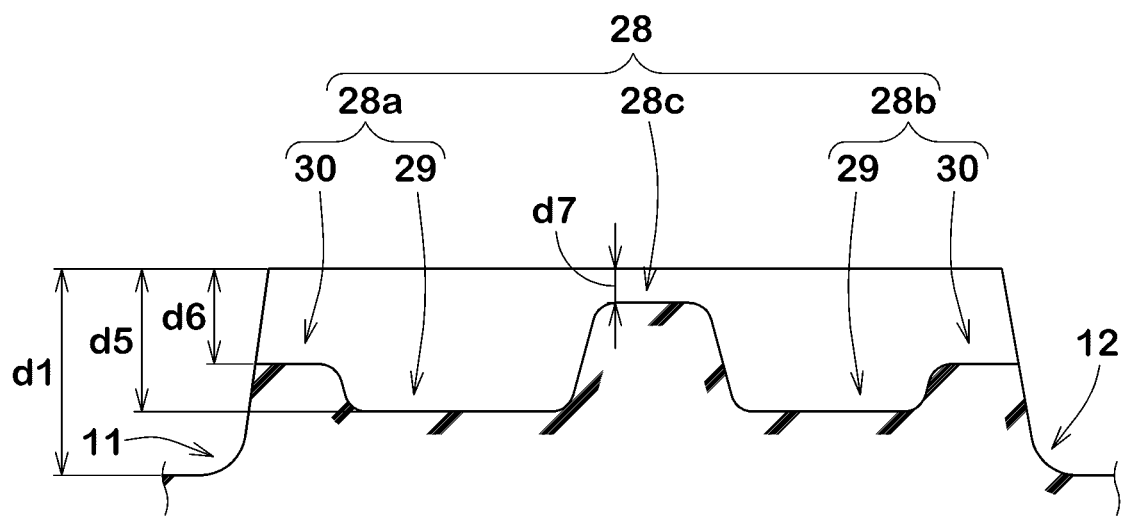
FIG. 4 is a cross-sectional view taken along C-C line of FIG. 2.

FIG. 4 is a cross sectional view of the crossing sipe 28 taken along C-C line of FIG. 2. As shown in FIG. 4, each of the first outer portion (28a) and the second outer portion (28b) includes a deep bottom portion 29 and a shallow bottom portion 30 having a depth smaller than the deep bottom portion 29. Each of the shallow bottom portions 30 is formed at an end portion in the tire axial direction of the crossing sipe 28, for example. Each of the deep bottom portions 29 is formed between respective one of the shallow bottom portions 30 and the center portion (28c) of the crossing sipe 28, for example. The crossing sipe 28 configured as such effectively increases the rigidity of the land region 21 by the center portion (28c) and the shallow bottom portions 30.

It is preferred that depths (d5) of the deep bottom portions 29 are in a range of from 0.65 to 0.75 times the depth (d1) of the first main groove 11, for example. It is preferred that depths (d6) of the shallow bottom portions 30 are in a range of from 0.60 to 0.70 times the depths (d5) of the deep bottom portions 29, for example. The crossing sipe 28 having the shallow bottom portions 30 and the deep bottom portions 29 can provide large frictional force by edges thereof during running on ice while increasing the rigidity of the land region 21.

It is preferred that the center portion (28c) has a depth (d7) smaller than those of the first outer portion (28a) and the second outer portion (28b), for example. It is preferred that the depth (d7) of the center portion (28c) is in a range of from 0.20 to 0.30 times the depth (d5) of the deep bottom portion 29 of the first outer portion (28a), for example. Further, it is preferred that the depth (d7) of the center portion (28c) is not greater than 0.30 times the depth (d1) of the first main groove 11.

As shown in FIG. 2, the block 26 is divided into a first block piece 26A and a second block piece 26B by the crossing sipe 28. The first block piece 26A is arranged on one side (lower side in FIG. 2) in the tire circumferential direction of the crossing sipe 28 and the second block piece 26B is arranged on the other side (upper side in FIG. 2) in the tire circumferential direction of the crossing sipe 28, for example. Each of the block pieces 26A and 26B is provided with a lug sipe 32 extending from the first main groove 11 or the second main groove 12 and terminating within the land region.

The first block piece 26A is provided with a first lug sipe 32A. The first lug sipe 32A extends from the first main groove 11, is inclined in the same direction as the first outer portion (28a), and terminates within the land region 21.

The second block piece 26B is provided with a second lug sipe 32B. The second lug sipe 32B extends from the second main groove 12, is inclined in the same direction as the second outer portion (28b), and terminates within the land region 21. It is possible that the first lug sipe 32A and the second lug sipe 32B improve the on-ice/on-snow performance by edges thereof while maintaining the rigidity of the land region 21.

It is preferred that the first lug sipe 32A intersects with an extended area obtained by extending the second lug groove portion 17 along a longitudinal direction thereof of one of the lateral grooves 15 adjacent to the first block piece 26A, for example. It is preferred that the second lug sipe 32B intersects with an extended area obtained by extending the first lug groove portion 16 along a longitudinal direction thereof of one of the lateral grooves 15 adjacent to the second block piece 26B, for example. Owing to such an arrangement of the lug sipes 32, it is possible that shearing deformation of the block 26 in the tire circumferential direction is moderately promoted, therefore, it is possible that clogging of snow in the lateral grooves 15 is suppressed.

It is preferred that the lug sipes 32 extend straight. The lug sipes 32 configured as such are helpful to suppress the uneven wear of edges of the land region. However, the lug sipes 32 may be curved, bent, or wavy, for example.

It is preferred that angles θ5 of the lug sipes 32 with respect to the tire axial direction is in a range of from 20 to 30 degrees, for example. In a more preferred embodiment, the first lug sipe 32A and the second lug sipe 32B extend in parallel with the first outer portion (28a) or the second outer portion (28b) of the crossing sipe 28, respectively. The lug sipes 32 configured as such can suppress the uneven wear of the land region 21.

As shown in FIG. 1, in this embodiment, the first land region 21 having the above-described configuration is disposed between the tire equator (C) and the first tread edge Te1 located, when the tire 1 is mounted on a vehicle, on the axially outer side of the vehicle. However, the first land region 21 is not limited to such an arrangement, and may be provided at any position of the tread portion 2.

The tread portion 2 in this embodiment is further provided with a second land region 22, a third land region 23, a fourth land region 24, and a fifth land region 25.

Figure 5:
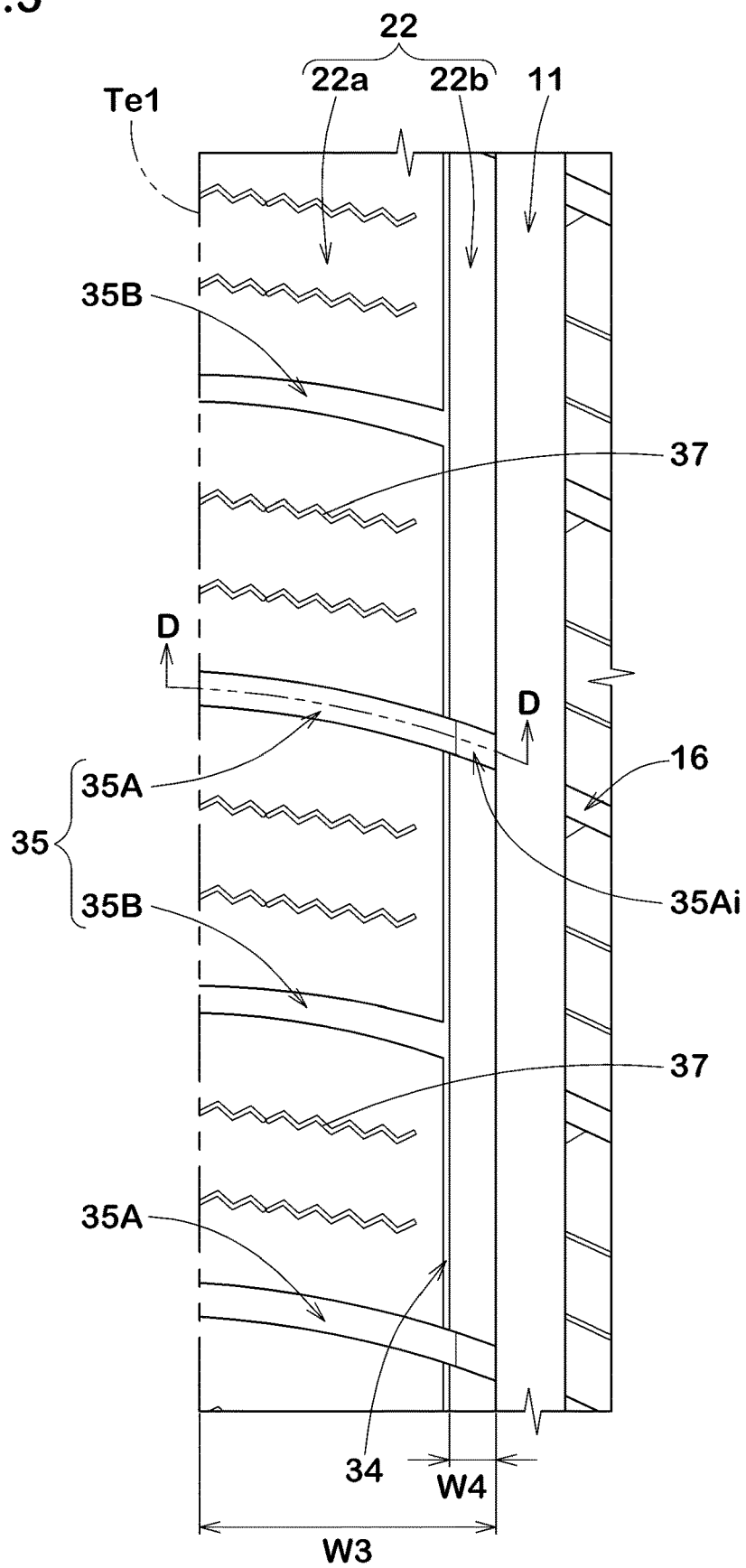
FIG. 5 is an enlarged view of a second land region of the tread portion.

FIG. 5 is an enlarged view of the second land region 22. As shown in FIG. 5, the second land region 22 is defined between the first main groove 11 and the first tread edge Te1. It is preferred that a width W3 in the tire axial direction of the second land region 22 is in a range of from 0.15 to 0.30 times the tread width TW, for example.

The second land region 22 in this embodiment is divided by a circumferential sipe 34 extending along the first main groove 11 into a main portion (22a) arranged between the first tread edge Te1 and the circumferential sipe 34, and a narrow portion (22b) arranged between the circumferential sipe 34 and the first main groove 11. A width W4 in the tire axial direction of the narrow portion (22b) is in a range of from 0.10 to 0.20 times the width W3 of the second land region 22, for example.

The second land region 22 is provided with a plurality of outer shoulder lateral grooves 35 extending from the first tread edge Te1 toward the first main groove 11, for example. The outer shoulder lateral grooves 35 are helpful for improving the wet performance and the on-ice/on-snow performance.

The outer shoulder lateral grooves 35 in this embodiment include, for example, first outer shoulder lateral grooves 35A connected with the first main groove 11 and second outer shoulder lateral grooves 35B terminating within the second land region 22. The first outer shoulder lateral grooves 35A and the second outer shoulder lateral grooves 35B are arranged alternately in the tire circumferential direction, for example.

It is preferred that an inner end portion (35Ai) in the tire axial direction of each of the first outer shoulder lateral grooves 35A intersects with an extended area obtained by extending the first lug groove portion 16 in the longitudinal direction thereof of respectively adjacent one of the lateral grooves 15 provided in the first land region 21. It is possible that the first outer shoulder lateral grooves 35A generate large snow pillars together with the first lug groove portions 16 during running on snow.

Figure 6:
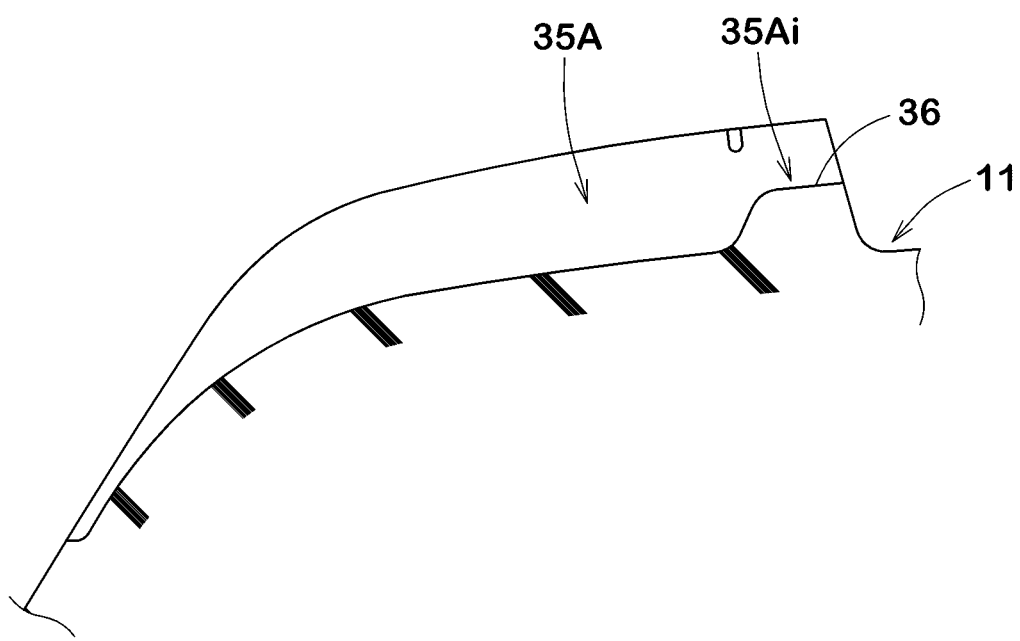
FIG. 6 is a cross-sectional view taken along D-D line of FIG. 5.

FIG. 6 is a cross sectional view of the first outer shoulder lateral groove 35A taken along D-D line of FIG. 5. As shown in FIG. 6, it is preferred that the inner end portion (35Ai) of each of the first outer shoulder lateral grooves 35A is provided with a tie bar 36 formed by raising a bottom surface thereof. The first outer shoulder lateral grooves 35A having the tie bars 36 are helpful for improving the steering stability on a dry road surface.

As shown in FIG. 5, the second outer shoulder lateral grooves 35B extend from the first tread edge Te1 to the circumferential sipe 34, for example. It is possible that the second outer shoulder lateral grooves 35B improve the wet performance and the on-ice/on-snow performance while maintaining rigidity of the second land region 22.

It is preferred that the second land region 22 in this embodiment is provided with outer shoulder sipes 37 each extending in the tire axial direction in a zigzag manner between a pair of the first outer shoulder lateral groove 35A and the second outer shoulder lateral groove 35B adjacent to each other. It is preferred that the outer shoulder sipes 37 extend from the first tread edge Te1 toward the first main groove 11 and terminate within the second land region 22, for example.

Figure 7:
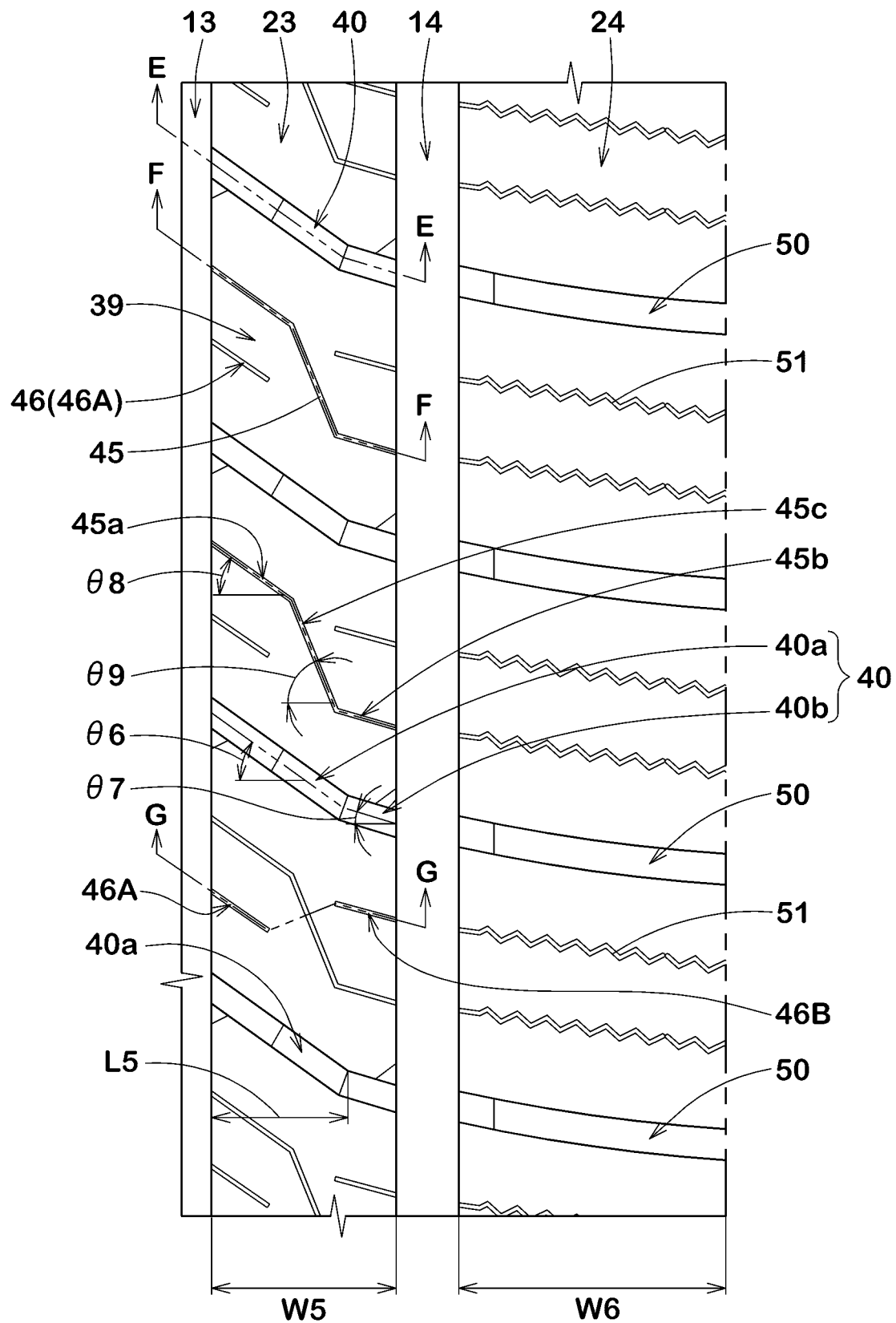
FIG. 7 is an enlarged view of a third land region and a fourth land region of the tread portion.

FIG. 7 is an enlarged view of the third land region 23 and the fourth land region 24. As shown in FIG. 7, the third land region 23 is defined between the third main groove 13 and the fourth main groove 14. The fourth land region 24 is defined between the second tread edge Te2 and the fourth main groove 14. It is preferred that a width W5 in the tire axial direction of the third land region 23 is in a range of from 0.10 to 0.20 times the tread width TW, for example. It is preferred that a width W6 in the tire axial direction of the fourth land region 24 is in a range of from 0.15 to 0.25 times the tread width TW, for example.

The third land region 23 is provided with a plurality of inner middle lateral grooves 40 and a plurality of inner middle blocks 39 divided by the inner middle lateral grooves 40, for example.

The inner middle lateral grooves 40 extend obliquely with respect to the tire axial direction, for example. Each of the inner middle lateral grooves 40 includes, for example, a first oblique portion (40a) extending from the third main groove 13 toward the fourth main groove 14, and a second oblique portion (40b) disposed between the first oblique portion (40a) and the fourth main groove 14 and extending at an angle smaller than the first oblique portion (40a). The inner middle lateral grooves 40 configured as such guide water in the grooves toward the second tread edge Te2 during running on a wet road surface, therefore, it is possible that the wet performance is improved.

The first oblique portion (40a) is inclined at an angle θ6 in a range of from 30 to 40 degrees with respect to the tire axial direction, for example. The first oblique portion (40a) extends toward the fourth main groove 14 so as to extend beyond a center position in the tire axial direction of the third land region 23, for example. It is preferred that a length L5 in the tire axial direction of the first oblique portion (40a) is in a range of from 0.65 to 0.80 times the width W5 of the third land region 23, for example.

The second oblique portion (40b) is inclined at an angle θ7 smaller than the angle θ6 with respect to the tire axial direction, for example. The angle θ7 of the second oblique portion (40b) is in a range of from 10 to 20 degrees, for example.

Figure 8A:
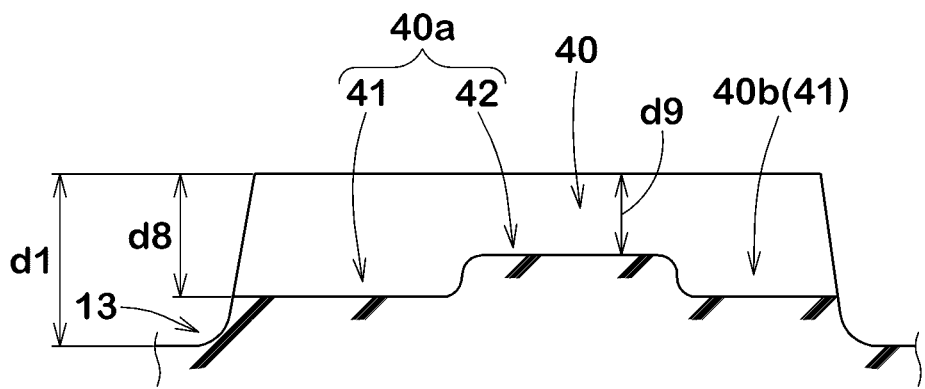
FIG. 8A is a cross-sectional view taken along E-E line of FIG. 7.

FIG. 8A is a cross sectional view of the inner middle lateral groove 40 taken along E-E line of FIG. 7. As shown in FIG. 8A, it is preferred that each of the inner middle lateral grooves 40 includes deep bottom portions 41 and a shallow bottom portion 42 having a depth smaller than those of the deep bottom portions 41.

More specifically, it is preferred that the first oblique portion (40a) has the deep bottom portions 41 and the shallow bottom portion 42 formed on a side closer to the second oblique portion (40b) of the deep bottom portions 41, and that the second oblique portion (40b) is formed as the deep bottom portions 41. Such an arrangement of the shallow bottom portion 42 effectively increases rigidity of a central portion in the tire axial direction of the third land region 23, therefore, excellent steering stability on a dry road surface is obtained.

It is preferred that depths (d8) of the deep bottom portions 41 are in a range of from 0.65 to 0.75 times the depth (d1) of the third main groove 13, for example. It is preferred that a depth d9 of the shallow bottom portion 42 is in a range of from 0.60 to 0.70 times the depths d8 of the deep bottom portions 41, for example.

As shown in FIG. 7, it is preferred that each of the inner middle blocks 39 is provided with a middle crossing sipe 45 extending so as to completely cross the block in the tire axial direction, and a middle lug sipes 46 each arranged between one of the inner middle lateral grooves 40 adjacent to the inner middle block 39 and the middle crossing sipe 45, for example.

The middle crossing sipes 45 extend obliquely in one direction with respect to the tire axial direction, for example. The middle crossing sipes 45 in this embodiment are inclined in the same direction as the inner middle lateral grooves 40, for example.

Each of the middle crossing sipes 45 includes, for example, a first portion (45a) extending from the third main groove 13, a second portion (45b) extending from the fourth main groove 14, and a third portion (45c) extending so as to connect between the first portion (45a) and the second portion (45b).

It is preferred that angles θ8 of the first portion (45a) and the second portion (45b) with respect to the tire axial direction is in a range of from 30 to 40 degrees, for example. It is preferred that the third portion (45c) is inclined at an angle θ9 larger than the angles θ8 of the first portion (45a) and the second portion (45b) with respect to the tire axial direction, for example. It is preferred that the angle θ9 is in a range of from 65 to 75 degrees, for example.

Figure 8B:
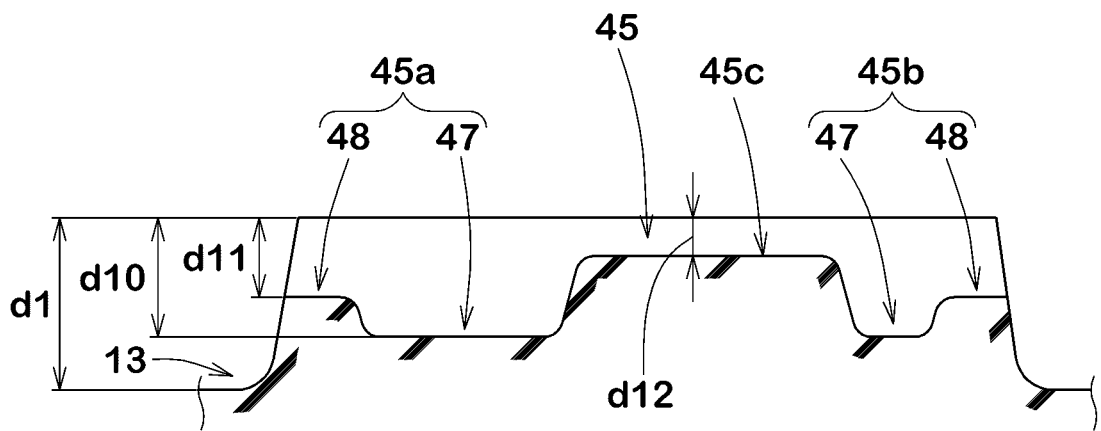
FIG. 8B is a cross-sectional view taken along F-F line of FIG. 7.

FIG. 8B is a cross sectional view of the middle crossing sipe 45 taken along F-F line of FIG. 7. As shown in FIG. 8B, in the middle crossing sipe 45, the third portion (45c) has a smaller depth than those of the first portion (45a) and the second portion (45b).

Each of the first portion (45a) and the second portion (45b) includes a deep bottom portion 47 and a shallow bottom portion 48 having a depth smaller than that of the deep bottom portion 47. Each of the shallow bottom portions 48 is provided at each end in the tire axial direction of the middle crossing sipe 45, for example. Each of the deep bottom portions 47 is provided between each of the shallow bottom portions 48 and the third portion (45c), for example.

It is preferred that depths (d10) of the deep bottom portions 47 are in a range of from 0.65 to 0.75 times the depth (d1) of the third main groove 13, for example. It is preferred that depths (d11) of the shallow bottom portions 48 are in a range of from 0.40 to 0.50 times the depth (d1) of the third main groove 13, for example. It is preferred that a depth (d12) of the third portion (45c) is in a range of from 0.15 to 0.25 times the depth (d1) of the first main groove 11, for example.

As shown in FIG. 7, the middle lug sipes 46 include first middle lug sipes 46A and second middle lug sipes 46B, for example. The first middle lug sipes 46A extend obliquely with respect to the tire axial direction from the third main groove 13 and terminate within the third land region 23, for example. In each of the inner middle blocks 39, the first middle lug sipe 46A is arranged, for example, on one side (lower side in FIG. 7) in the tire circumferential direction of the middle crossing sipe 45 and extends along the first portion (45a) of the middle crossing sipe 45, for example.

The second middle lug sipes 46B extend obliquely from the fourth main groove 14 with respect to the tire axial direction and terminate within the third land region 23, for example. In each of the inner middle blocks 39, the second middle lug sipe 46B is arranged on the other side (upper side in FIG. 7) in the tire circumferential direction of the middle crossing sipe 45 and extends along the second portion (45b) of the middle crossing sipe 45, for example.

Figure 9:
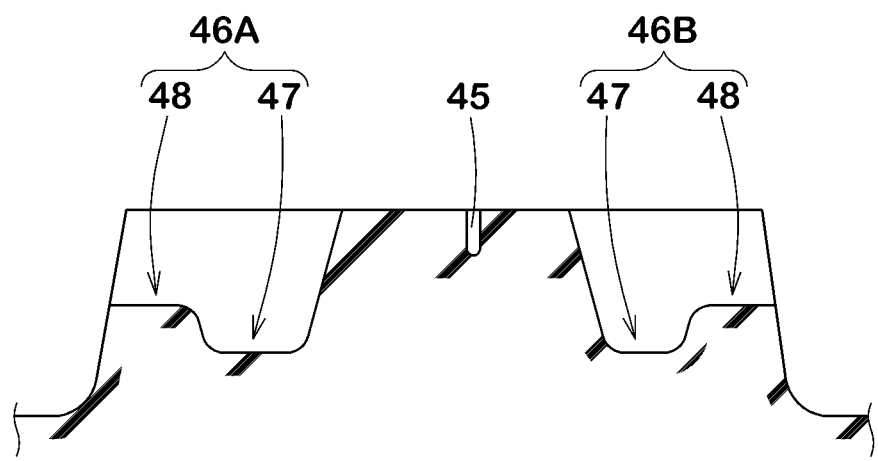
FIG. 9 is a cross-sectional view taken along G-G line of FIG. 7.

FIG. 9 is a cross sectional view of the first middle lug sipe 46A and the second middle lug sipe 46B taken along G-G line of FIG. 7. As shown in FIG. 9, each of the first middle lug sipe 46A and the second middle lug sipe 46B includes, for example, the deep bottom portion 47 and the shallow bottom portion 48 having a smaller depth than the deep bottom portion 47. Each of the shallow bottom portions 48 in this embodiment is formed at an end portion on a side of respective main groove of each of the middle lug sipes 46. It is preferred that dimensions of the deep bottom portions 47 and the shallow bottom portions 48 of the first middle lug sipes 46A and the second middle lug sipes 46B are set to be in same ranges as those of the deep bottom portions 47 and the shallow bottom portions 48 of the above described middle crossing sipes 45, for example.

As shown in FIG. 7, it is preferred that the fourth land region 24 is provided with inner shoulder lateral grooves 50 and inner shoulder sipes 51.

The inner shoulder lateral grooves 50 extend so as to connect between the second tread edge Te2 and the fourth main groove 14, for example. In a preferred embodiment, each of the inner shoulder lateral grooves 50 is smoothly connected with adjacent one of the above described inner middle lateral grooves 40 with the fourth main groove 14 therebetween. The inner shoulder lateral grooves 50 configured as such can exert excellent wet performance and on-ice/on-snow performance.

It is preferred that each of the inner shoulder lateral grooves 50 has a substantially same cross-sectional shape as the first outer shoulder lateral groove 35A shown in FIG. 6, for example. That is, it is preferred that a tie bar (not shown) formed by raising a bottom surface thereof is provided at an inner end portion of each of the inner shoulder lateral grooves 50.

It is preferred that each of the inner shoulder sipes 51 extends in a zigzag manner from the second tread edge Te2 to the fourth main groove 14, for example.

Figure 10:
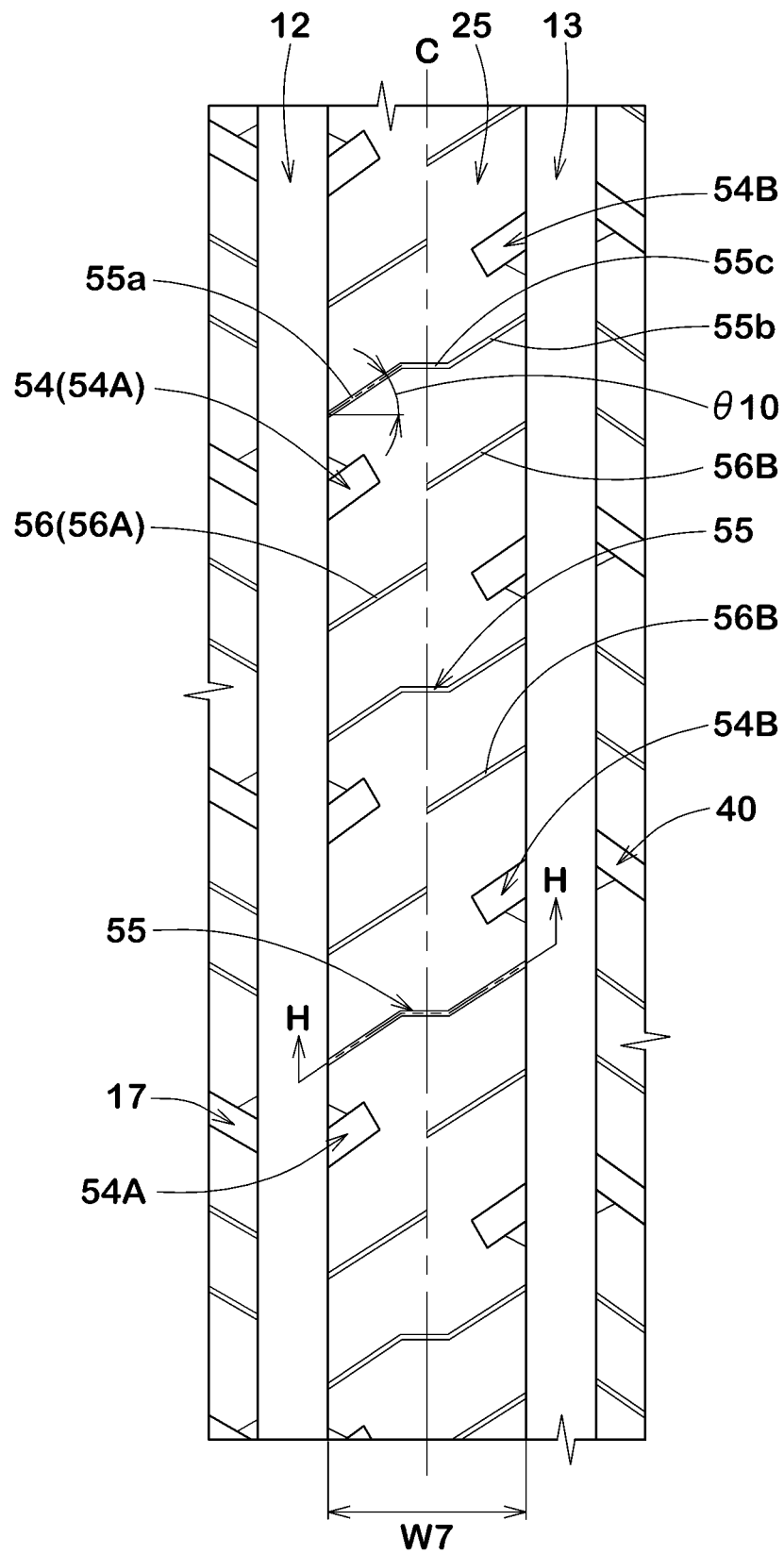
FIG. 10 is an enlarged view of a fifth land region of FIG. 1.

FIG. 10 is an enlarged view of the fifth land region 25. As shown in FIG. 10, the fifth land region 25 is defined between the second main groove 12 and the third main groove 13. It is preferred that a width W7 in the tire axial direction of the fifth land region 25 is in a range of from 0.10 to 0.15 times the tread width TW, for example.

The fifth land region 25 is provided with a plurality of crown lug grooves 54, a plurality of crown crossing sipes 55 extending so as to completely cross the fifth land region 25, and a plurality of crown lug sipes 56, for example.

The crown lug grooves 54 include first crown lug grooves 54A and second crown lug grooves 54B, for example. The first crown lug grooves 54A extend from the second main groove 12 and terminate within the fifth land region 25, for example. The second crown lug grooves 54B extend from the third main groove 13 and terminate within the fifth land region 25, for example.

It is preferred that the crown lug grooves 54 are inclined in the opposite directions to the second lug groove portions 17 of the lateral grooves 15 provided in the first land region 21, for example. Each of the crown lug grooves 54 configured as such, together with the lateral grooves 15, can exert frictional force in multiple directions on ice and snow.

As shown in FIG. 10, it is preferred that each of the first crown lug grooves 54A intersects with an extended area obtained by extending an end portion of adjacent one of the second lug groove portions 17 of the lateral grooves 15 of the first land region 21 along the tire axial direction, for example. Further, it is preferred that each of the second crown lug grooves 54B intersects with an extended area obtained by extending an end portion of adjacent one of the inner middle lateral grooves 40 of the third land region 23 along the tire axial direction, for example. Such an arrangement of the grooves is useful for forming larger snow blocks during running on snow.

It is preferred that the crown crossing sipes 55 are inclined in the same directions as the first crown lug grooves 54A, for example. Each of the crown crossing sipes 55 includes a first portion (55a) extending from the second main groove 12, a second portion (55b) extending from the third main groove 13, and a third portion (55c) extending so as to connect between the first portion (55a) and the second portion (55b), for example.

It is preferred that angles θ10 of the first portions (55a) and the second portions (55b) with respect to the tire axial direction are in a range of from 30 to 40 degrees, for example. It is preferred that the third portions (55c) extend along the tire axial direction, for example.

Figure 11:
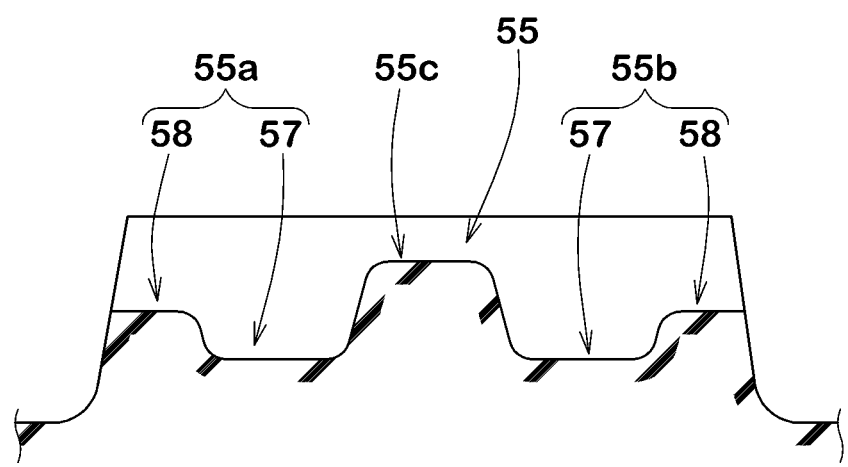
FIG. 11 is cross-sectional view taken along H-H line of FIG. 10.

FIG. 11 is a cross sectional view of the crown crossing sipe 55 taken along H-H line of FIG. 10. As shown in FIG. 11, in each of the crown crossing sipes 55, the third portion (55c) has a smaller depth than the first portion (55a) and the second portion (55b).

Each of the first portion (55a) and the second portion (55b) includes a deep bottom portion 57 and a shallow bottom portion 58 having a depth smaller than that of the deep bottom portion 57. Each of the shallow bottom portions 58 is provided at each end in the tire axial direction of the crown crossing sipe 55, for example. Each of the deep bottom portions 57 is provided between the respective shallow bottom portion 58 and the third portion (55c), for example.

It is preferred that the deep bottom portions 57 and the shallow bottom portions 58 of the crown crossing sipes 55 have depths in a range similar to those of the deep bottom portions 47 and the shallow bottom portions 48 (shown in FIG. 8B) of the middle crossing sipes 45 described above, for example.

As shown in FIG. 10, the crown lug sipes 56 include first crown lug sipes 56A and second crown lug sipes 56B, for example.

The first crown lug sipes 56A extend obliquely with respect to the tire axial direction from the second main groove 12 and terminate within the fifth land region 25, for example. Each of the first crown lug sipes 56A is arranged on one side (upper side in FIG. 10) in the tire circumferential direction of its adjacent one of the crown crossing sipes 55 and extends along the first portion (55a) of the crown crossing sipe 55, for example.

<Steering Stability on Dry Road Surface>

A test driver drove the test car on a dry road surface and the steering stability was evaluated by the driver's feeling during the test drive. The results are indicated by an evaluation point based on Reference being 100, wherein the larger the numerical value, the better the steering stability on a dry road surface is.

The test results are shown in Table 1.

TABLE 1

Figure 12:
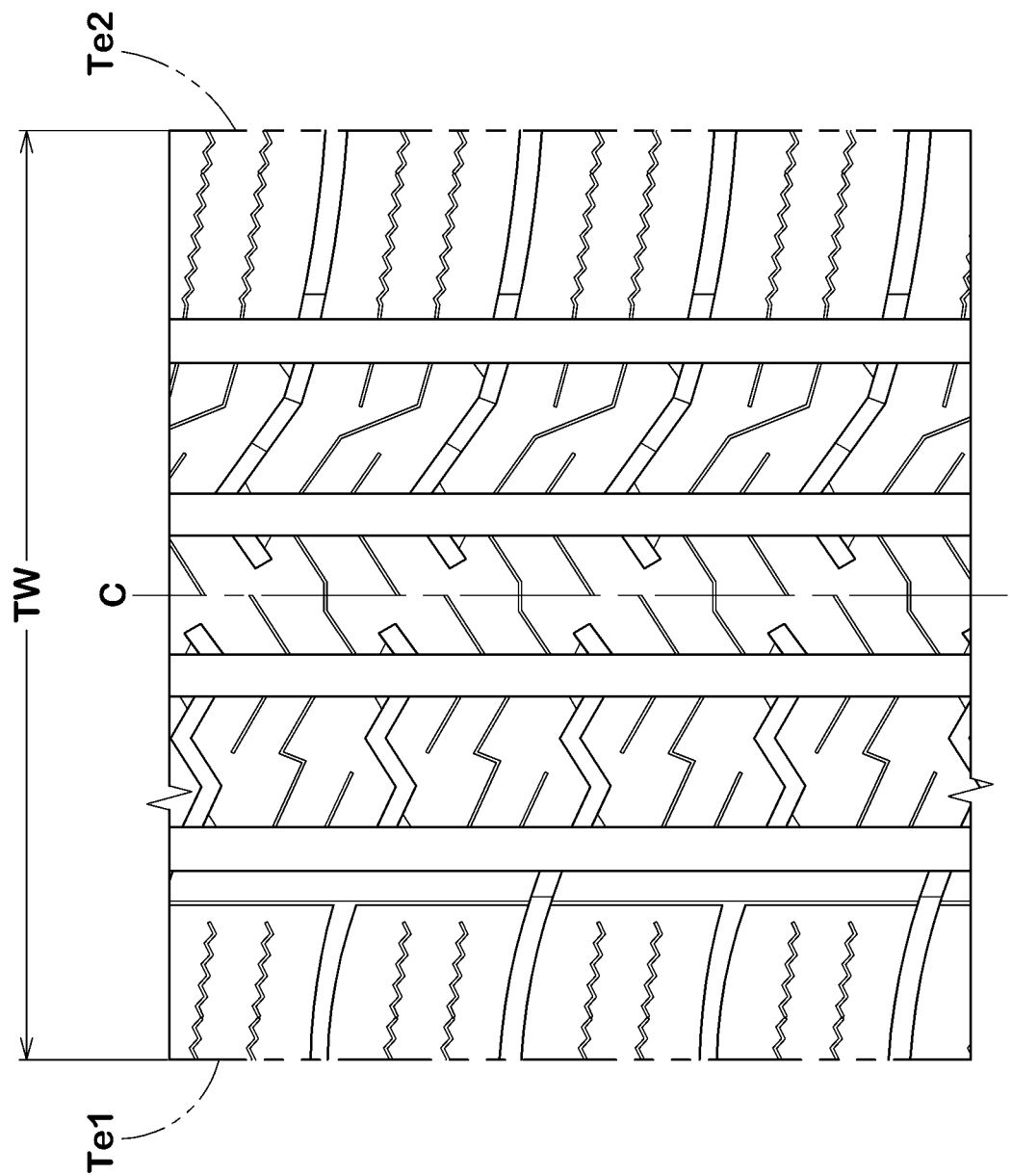
FIG. 12 is a development view of reference.

|  | Ref. 1 | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Figure showing Tread pattern | FIG. 12 | FIG. 1 | FIG. 1 | FIG. 1 | FIG. 1 | FIG. 1 | FIG. 1 | FIG. 1 | FIG. 1 | FIG. 1 |
| Length L2 of Sipe portion/ Length l1 of First lug groove | — | 0.70 | 0.60 | 0.65 | 0.75 | 0.80 | 0.70 | 0.70 | 0.70 | 0.70 |
| Depth d7 of Center portion/ Depth d5 of First outer portion | 0.24 | 0.24 | 0.24 | 0.24 | 0.24 | 0.24 | 0.15 | 0.20 | 0.30 | 0.35 |
| On-ice/on-snow performance [index] | 100 | 100 | 101 | 100 | 99 | 97 | 98 | 99 | 100 | 100 |
| Steering stability on Dry road surface [evaluation point] | 100 | 108 | 106 | 107 | 109 | 109 | 108 | 108 | 108 | 106 |

The second crown lug sipes 56B extend obliquely with respect to the tire axial direction from the third main groove 13 and terminate within the fifth land region 25, for example. Each of the second crown lug sipes 56B is arranged on the other side (lower side in FIG. 10) in the tire circumferential direction of its adjacent one of the crown crossing sipes 55 and extends along the second portion (55b) of the crown crossing sipe 55, for example.

It is preferred that, like the middle lug sipes 46 (shown in FIG. 9) described above, each of the crown lug sipes 56 includes a deep bottom portion and a shallow bottom portion having a smaller depth than that of the deep bottom portion (not shown). The shallow bottom portion of the crown lug sipe 56 in this embodiment is formed at an end portion on a side of the main groove of each of the crown lug sipes 56, for example.

While detailed description has been made of the tire as an embodiment of the present invention, the present invention can be embodied in various forms without being limited to the illustrated embodiment.

Working Example (Example)

Tires of size 215/60R16 having the basic pattern shown in FIG. 1 were made by way of test according to the specifications listed in Table 1. As a reference, a tire having a tread pattern shown in FIG. 12 was made by way of test. Each of the test tires was tested for the on-ice/on-snow performance, and the steering stability on a dry road surface. Common specifications and test methods are as follows.

Tire rim: 16×6J
Tire pressure: 210 kPa
Test car: front wheel drive car with a displacement of 2400 cc
Tire mounting position: all wheels
<On-Ice/On-Snow Performance>

A distance needed for accelerating the above test car from 5 km/h to 20 km/h on an icy and snowy road surface was measured by GPS and an average acceleration was calculated. The results are indicated by an index based on the average acceleration of Reference being 100, wherein the larger the numerical value, the better the on-ice/on-snow performance is.

From the test results, it was confirmed that the tires as the examples showed both good steering stability on a dry road surface and good on-ice/on-snow performance.

The invention claimed is:
1. A tire comprising:
a tread portion comprising
a first main groove and a second main groove extending continuously in a tire circumferential direction, and
a land region defined between the first main groove and the second main groove, the land region being provided with a plurality of lateral grooves, wherein
each of the lateral grooves comprises
a first lug groove portion extending obliquely with respect to a tire axial direction from the first main groove,
a second lug groove portion extending obliquely in a same direction as the first lug groove portion from the second main groove, and
a sipe portion extending obliquely in an opposite direction to the first lug groove portion so as to connect between the first lug groove portion and the second lug groove portion, wherein
the first lug groove portion has a maximum depth different from that of the second lug groove portion,
the land region includes a plurality of blocks divided by the lateral grooves,
the blocks include at least one block provided with a crossing sipe,
the crossing sipe comprises
a first outer portion extending obliquely in the same direction as the first lug groove portion from the first main groove,
a second outer portion extending obliquely in the same direction as the first lug groove portion from the second main groove, and
a center portion extending obliquely in the opposite direction to the first lug groove portion so as to connect between the first outer portion and the second outer portion,
the at least one block is provided with
a first lug sipe extending obliquely in a same direction as the first outer portion from the first main groove and terminating within the at least one block, and
a second lug sipe extending obliquely in a same direction as the second outer portion from the second main groove and terminating within the at least one block,
the at least one block is divided by the crossing sipe into a first block piece and a second block piece, the first lug sipe is arranged in the first block piece, the second lug sipe is arranged in the second block piece, the first lug sipe intersects with an extended area obtained by extending the second lug groove portion along a longitudinal direction thereof of one of the lateral grooves adjacent to the first block piece, and the second lug sipe intersects with an extended area obtained by extending the first lug groove portion along a longitudinal direction thereof of one of the lateral grooves adjacent to the second block piece.

2. The tire according to claim 1, wherein the sipe portion has a width not greater than 1.5 mm, and the first lug groove portion and the second lug groove portion have widths greater than 1.5 mm.

3. The tire according to claim 1, wherein the sipe portion has a length in the tire axial direction smaller than those of the first lug groove portion and the second lug groove portion.

4. The tire according to claim 1, wherein the center portion has a depth smaller than those of the first outer portion and the second outer portion.

5. The tire according to claim 1, wherein the center portion is inclined with respect to the tire axial direction at a larger angle than that of the sipe portion.

6. The tire according to claim 5, wherein, the angle of the center portion with respect to the tire axial direction is in a range of from 65 to 75 degrees.

7. The tire according to claim 1, wherein the center portion overlaps the sipe portion in the tire axial direction.

8. The tire according to claim 1, wherein, both groove edges of each of the first lug groove portion and the second lug groove portion extend linearly in their entire lengths.

9. The tire according to claim 1, wherein, each of the first outer portion and the second outer portion includes a deep bottom portion and a shallow bottom portion having a depth smaller than the deep bottom portion, the shallow bottom portions are formed at both end portions in the tire axial direction of the crossing sipe, and each of the deep bottom portions is formed between the center portion and a respective one of the shallow bottom portions of the crossing sipe.

10. The tire according to claim 1, wherein, angles of the first lug groove portion and the second lug groove portion with respect to the tire axial direction are each 20 degrees or more and 30 degrees or less.

11. The tire according to claim 1, wherein, lengths in the tire axial direction of the first lug groove portion and the second lug groove portion are each 0.30 times or more and 0.40 times or less a width in the tire axial direction of the land region.

12. The tire according to claim 1, wherein, an angle of the sipe portion with respect to the tire axial direction is 25 degrees or more and 40 degrees or less.

13. The tire according to claim 1, wherein, lengths in the tire axial direction of the first outer portion and the second outer portion are each 0.45 times or more and 0.55 times or less a width in the tire axial direction of the land region.

14. The tire according to claim 1, wherein, the first lug sipe and the second lug sipe extend in parallel with the first outer portion or the second outer portion of the crossing sipe, respectively.

\* \* \* \* \*